(12) United States Patent
Inoue et al.

(10) Patent No.: US 6,575,618 B1
(45) Date of Patent: Jun. 10, 2003

(54) INFORMATION PROCESSING DEVICE

(75) Inventors: Shigeki Inoue, Shiojiri (JP); Yoshito Uzawa, Chofu (JP); Hajime Kurihara, Nagano-ken (JP); Motomu Hayakawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/341,902

(22) PCT Filed: Nov. 16, 1998

(86) PCT No.: PCT/JP98/05145

§ 371 (c)(1),
(2), (4) Date: Jul. 19, 1999

(87) PCT Pub. No.: WO99/26117

PCT Pub. Date: May 27, 1999

(30) Foreign Application Priority Data

Nov. 19, 1997 (JP) ............................................. 9-318627
Feb. 26, 1998 (JP) ........................................... 10-045547

(51) Int. Cl.$^7$ ................................................. G01D 5/00
(52) U.S. Cl. ......................... 368/295; 368/10; 368/69; 250/231.13; 250/231.18
(58) Field of Search .......................... 368/70, 185–187, 368/69, 294–296, 319–321, 250, 223, 295, 11, 47; 250/231.13, 231.14, 231.18, 231.17, 559.29, 338.1; 341/13, 137

(56) References Cited

U.S. PATENT DOCUMENTS

| 4,019,037 | A | * | 4/1977 | Monna | 368/223 |
|---|---|---|---|---|---|
| 4,377,004 | A | * | 3/1983 | Wassink | 368/187 |
| 4,420,263 | A | * | 12/1983 | Besson et al. | 368/187 |
| 4,645,357 | A | * | 2/1987 | Allgaier et al. | 368/187 |
| 4,678,344 | A | * | 7/1987 | Inoue | 368/187 |
| 4,726,687 | A | * | 2/1988 | Gander | 368/321 |
| 4,914,831 | A | * | 4/1990 | Kanezashi et al. | 33/780 |
| 4,947,166 | A | * | 8/1990 | Wingate et al. | 341/13 |
| 5,103,225 | A | * | 4/1992 | Dolan et al. | 341/13 |
| 5,285,426 | A | * | 2/1994 | Teodoridis | 368/10 |
| 5,444,671 | A | * | 8/1995 | Tschannen et al. | 368/10 |
| 5,508,978 | A | * | 4/1996 | Kalbermatter et al. | 368/10 |
| 6,038,523 | A | * | 3/2000 | Akahane et al. | 368/250 |
| 6,291,815 | B1 | * | 9/2001 | Sugiyama et al. | 250/231.13 |
| 6,407,379 | B1 | * | 6/2002 | Shinbo | 250/231.13 |

FOREIGN PATENT DOCUMENTS

| JP | 50-73339 | 11/1973 | | |
|---|---|---|---|---|
| JP | 60-7316 | 1/1985 | | |
| JP | 61-66927 | 4/1986 | | |
| JP | 61-186889 | 8/1986 | | |
| JP | 62-65594 | 4/1987 | | |
| JP | 63-151807 | 6/1988 | | |
| JP | 2-2689 | 1/1990 | | |
| JP | 4-138295 | 12/1992 | | |
| JP | 2000111673 A | * | 4/2000 | 250/231.13 |
| JP | 2001066383 A | * | 3/2001 | 250/231.13 |

* cited by examiner

*Primary Examiner*—Vit Miska
*Assistant Examiner*—Jeanne-Marguerite Goodwin
(74) *Attorney, Agent, or Firm*—Mark P. Watson

(57) ABSTRACT

An information processing device to which data can be input by the use of a rotary bezel. A pulse-count detection sensor unit 32 and a rotational-direction detection sensor unit 33 read an optical pattern which is formed on the rotary bezel to generate a series of pulse signals. The pulse-count detection sensor unit 32 and the rotational-direction detection sensor unit 33 are arranged such that a phase difference occurs between the signals of the sensor unit 32 and the signals of the sensor unit 33, so that it is possible to detect the rotational direction of the rotary bezel. A data-signal generating element 81 generates a data signal on the basis of the detected rotational angle and the pulse count generated by the pulse-count detection sensor unit 32.

14 Claims, 11 Drawing Sheets

OPTICAL PATTERN ON PULSE-NUMBER DETECTION SENSOR UNIT

SERIES OF PULSE SIGNALS

INFORMATION PROCESSING DEVICE

BACKGROUND OF THE INVENTION

1. Technical Field

The present invention relates to an information processing device to which data can be input by the use of a rotary body.

2. Technical Background

Conventionally, as an input device such as a mode switching device and a time correction device of a small-sized instrument, e.g., a wristwatch, a device is used having a rotary bezel 1 as shown in FIG. 1. In the device, a mechanical switch is driven by operation of the rotary bezel 1. For example, a pin is inserted in the case body of the wristwatch. When the user rotates the rotary bezel 1 to move or shift the pin, the pin presses one of several circuit springs, so as to switch the currently used circuit with a new one. Therefore, the mode is switched.

Further, in a desk top tape printing device or the like, a rotary character input device is used which has a rotary switch.

However, in order to provide as many as several dozen circuits for, e.g., character input, in the above-described input device having the mechanical switch, the structure thereof becomes complicated and, therefore, the size must be enlarged. Accordingly, it has been impossible to mount the input device on a small-sized portable information device or the like, such as a wristwatch. Moreover, since a part of the mechanical switch mechanism is exposed to the outside of the wristwatch, there is a problem in that water proofing may be insufficient.

In view of the above, there is a device in which a gear mechanism is used to transmit rotation of the rotary bezel to an internal ring for rotating the internal ring. In the device, a lower-surface pattern of the internal ring is read by a sensor, and the mode is selected on the basis of the result. In this device, it is possible to improve the water proofing. However, there are drawbacks: the mechanism is complicated and the device is large-sized.

Furthermore, there are no small-sized and thin rotary character input devices, which can be mounted on a small-sized information processing device, such as a wristwatch-type device.

SUMMARY OF THE INVENTION

Accordingly, the present invention provides an information processing device in which a plurality of data can be input while the device can be readily made small and thin, and which is excellent in operability and water proofing.

In an aspect of the present invention, an information processing device comprises a support body, a rotary body arranged on the support body and rotatable by manual operation of a user, a detection sensor mechanism provided on the support body for detecting a rotational angle and a rotational direction of the rotary body, signal generating means for generating a signal on the basis of the rotational angle and the rotational direction which are detected by the detection sensor mechanism, and a display device for displaying data corresponding to the signal which is generated by the signal generating means.

DETAILED DESCRIPTION

Hereunder, embodiments of the present invention will be described with reference to the drawings.

A. First Embodiment

A-1. Arrangement

Figure 1:
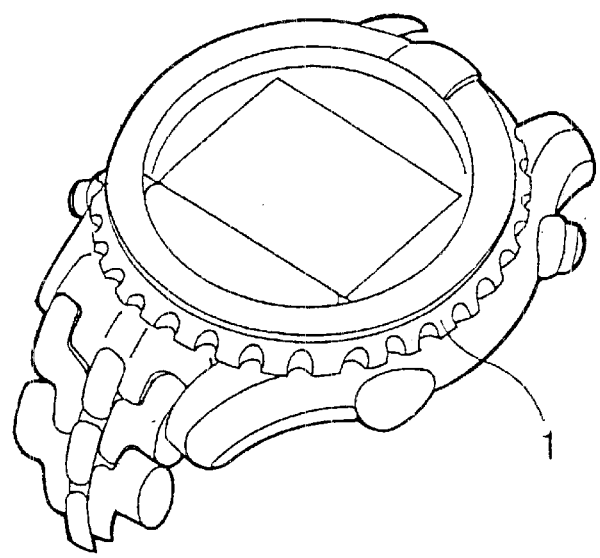
FIG. 1 is a perspective view showing a wristwatch which is provided with a rotary bezel.
Figure 2:
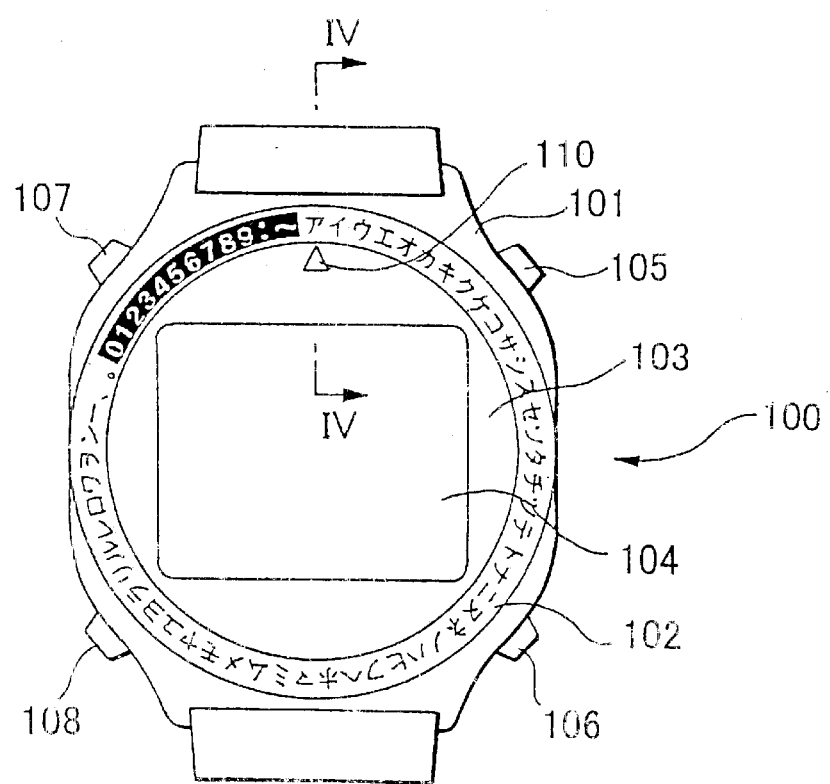
FIG. 2 is a front elevational view of a wristwatch-type information processing device according to a first embodiment of the present invention.

FIG. 2 is a front elevation of a wristwatch-type information processing device 100 according to a first embodiment of the present invention. In FIG. 2, reference numeral 101 denotes a case body of the wristwatch-type information processing device 100. On the front side (recto side of FIG. 2) of the case body (support body) 101, a rotary bezel (rotary body) 102 of a circular ring shape is arranged slidably on the case body 101. On the front surface of the rotary bezel 102, symbols such as ア イ ウ ... that are Japanese characters and "9," ";," "!," "A" that are numerals or signs, are indicated at regular intervals by printing or any suitable manner. The symbols formed on the front surface of the rotary bezel 102 are not limited to Japanese characters and may be other alphabetical or other characters.

Inside the rotary bezel 102, a cover glass 103 is arranged. On the lower side (verso side of FIG. 2) of this cover glass 103, a display device 104 is arranged, such as a liquid crystal panel, on which the data input into the wristwatch-type information processing device 100 is displayed. On an upper part of the display device 104 in FIG. 2, a pointer 110 is formed by printing or any other suitable manner for pointing to one of the symbols on the rotary bezel 102. A decision switch 105, a deletion switch 106, a voiced consonant mark switch 107 and a starting point switch 108 are arranged on the periphery of the case body 101. Functions of these switches will be described later. These switches may be provided on the cover glass 103 instead of the case body 101.

Figure 3:
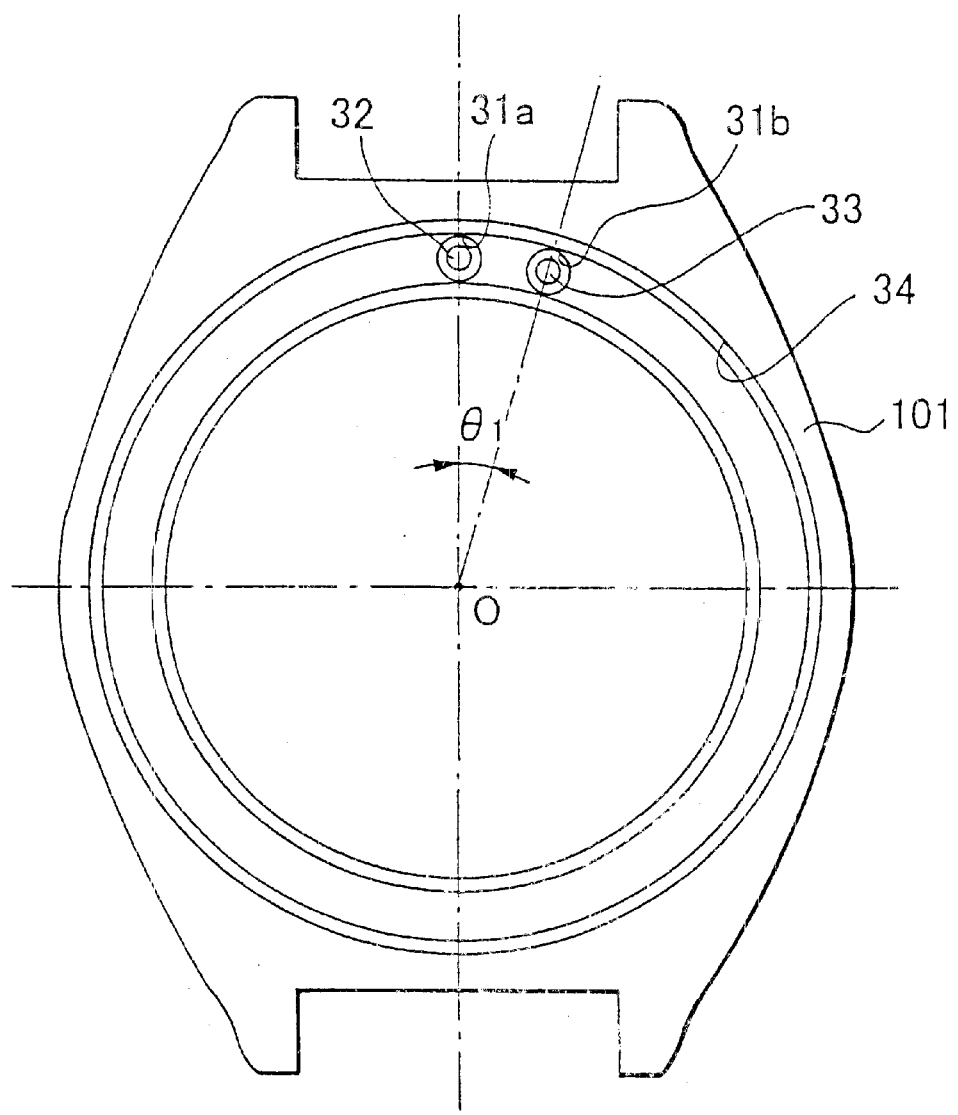
FIG. 3 is a front view showing the wristwatch-type information processing device in FIG. 2 from which a rotary bezel is removed.

FIG. 3 is a front view showing the wristwatch-type information processing device in FIG. 2 from which a rotary bezel is removed. As shown in FIG. 3, holes 31*a* and 31*b* are formed in the case body 101, and a pulse-count detection sensor unit 32 and a rotational-direction detection sensor unit 33 are arranged respectively within the holes 31*a* and 31*b*. The pulse-count detection sensor unit 32 and the rotational-direction detection sensor unit 33 are so arranged that a line connecting the pulse-count detection sensor unit 32 with the center O of rotation of the rotary bezel 102 and a line connecting the rotational-direction detection sensor unit 33 with the center O cooperate to form an angle $\theta_1$. The pulse-count detection sensor unit 32 is arranged below (verso side of FIG. 2) one of the symbols pointed by the pointer 110 (ア in the case of FIG. 2). The angle $\theta_1$ will be described later in more detail.

Figure 4:
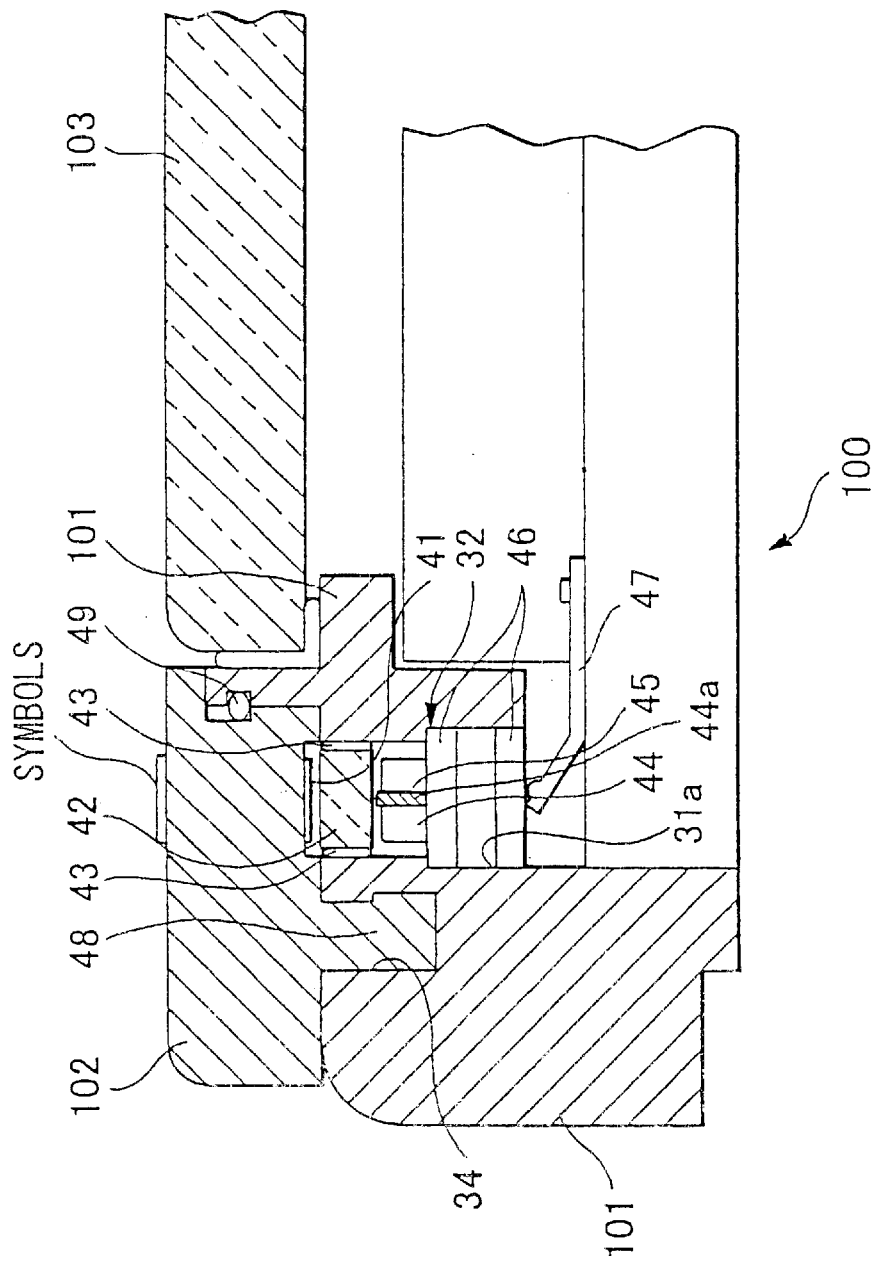
FIG. 4 is a cross-sectional view as viewed along a line IV—IV of FIG. 2.

FIG. 4 is a view as viewed along a line IV—IV of FIG. 2. As shown in FIG. 4, on the rear surface of the rotary bezel 102, an optical pattern 41 is formed annularly so as to correspond to the annular series of the symbols indicated at the front surface of the rotary bezel 102. Below the surface on which this optical pattern 41 is formed, a sensor cover glass 42 for protecting the pulse-count detection sensor unit 32 is mounted on the case body 101. The sensor cover glass 42 is a transparent member that permits light to pass between the pulse-count detection sensor unit 32 and the optical pattern 41. A gasket 43 is arranged between the inner surface of the hole 31*a* of the case body 101 and the sensor cover glass 42. Thus, a closed space is formed below the sensor cover glass 42, and it is possible to prevent the lower part of the sensor cover glass 42 from being exposed to water or the like.

Below the sensor cover glass 42, the pulse-count detection sensor unit 32 is arranged. The pulse-count detection sensor unit 32 is comprised of an LED (light emitting diode) 44, a photo-diode 45, a light shielding plate 44*a* arranged between the LED 44 and the photo-diode 45, and substrates 46. The LED 44 emits a light toward the optical pattern 41. The photo-diode 45 receives the reflected light from the optical pattern 41. The pulse-count detection sensor unit 32 generates a series of pulse signals on the basis of the reflected light received by the photo-diode 45. The pulse count generated by the pulse-count detection sensor unit 32 is counted by a data-signal generating element 81 (refer to FIG. 9) which will be described later, so that the rotational angle of the rotary bezel 102 is detected. The rotational-direction detection sensor unit 33 has an arrangement similar to the pulse-count detection sensor unit 32 and reads the optical pattern 41 to generate a series of pulse signals.

Below the lower substrate 46 of the pulse-count detection sensor unit 32, a contact spring 47 is provided. By this contact spring 47, the pulse-count detection sensor unit 32 is electrically connected to a CPU of the wristwatch-type information processing device 100. A lead line may be provided in place of the contact spring 47.

As shown in FIGS. 3 and 4, a circular groove 34 is formed in the front surface of the case body 101. On the other hand, as shown in FIG. 4, a projected ridge 48 which projects downwardly is formed on the rear surface of the rotary bezel 102. The projected ridge 48 is slidably fitted in the groove 34. An O-ring 49 is arranged between the inner surface of the rotary bezel 102 and the outer surface of the case body 101. Thus, water, light or the like is prevented from entering the interior of the wristwatch-type information processing device 100.

Figure 5:
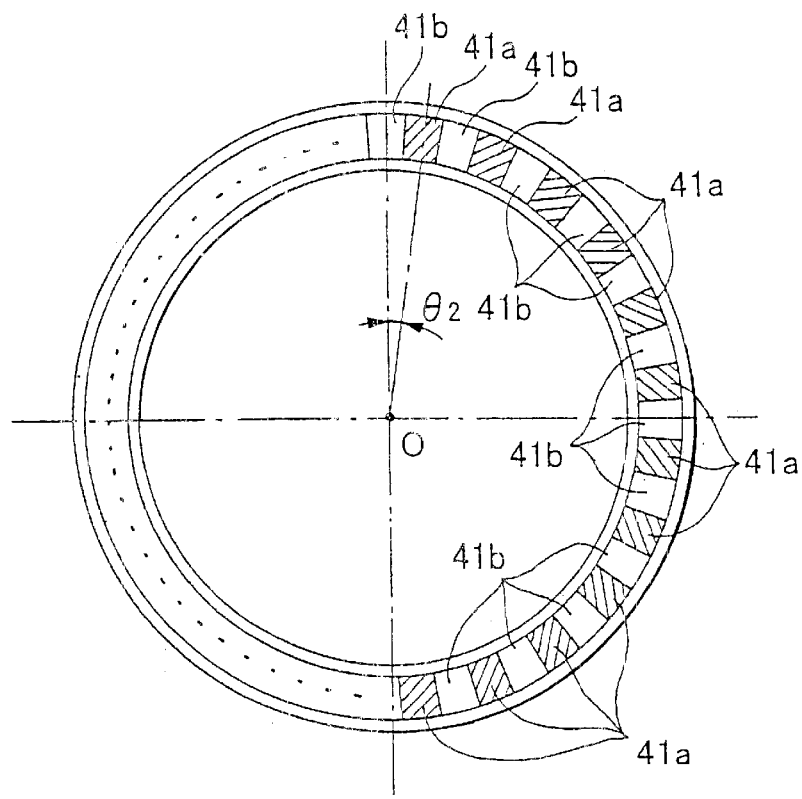
FIG. 5 is a view showing a rear surface of the rotary bezel of the wristwatch-type information processing device.
Figure 6:
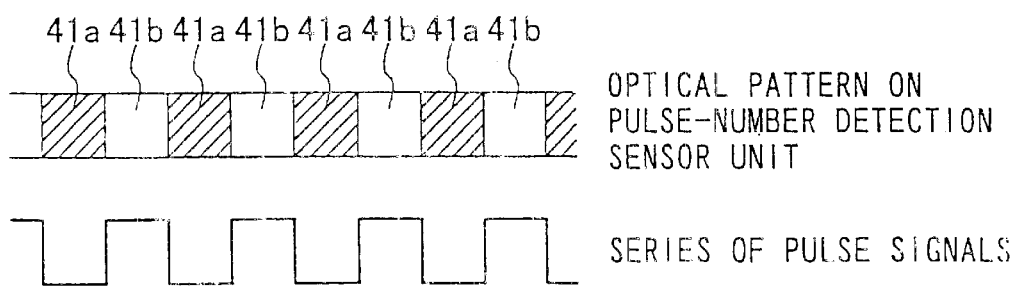
FIG. 6 is a diagram showing an optical pattern formed on the rotary bezel and a series of pulse signals generated by a pulse-count detection sensor unit in the wristwatch-type information processing device when reading this optical pattern.

Next, the optical pattern 41 will be described. FIG. 5 is a view showing the rear surface of the rotary bezel 102. As shown in FIG. 5, the optical pattern 41 is provided with absorption areas 41*a* which absorb most of the light irradiated by the LED 44, and reflection areas 41*b* which reflect most of the light irradiated by the LED 44. The absorption areas 41*a* and the reflection areas 41*b* are formed alternately at regular angular intervals of an angle $\theta_2$. The angle $\theta_2$ equals 360/n (degrees) where n is an even number that is the number of symbols on the front surface of the rotary bezel 102. The pulse-count detection sensor unit 32 reads the absorption areas 41*a* and the reflected areas 41b alternately when the user rotates the rotary bezel 102, whereby it is possible to generate the series of pulse signals shown in FIG. 6. This pulse count is detected whereby it is possible to detect the rotational angle of the rotary bezel 102. The rotational-direction detection sensor unit 33 also generates a series of pulse signals similarly.

Next, the angle $\theta_1$ between the units 32 and 33 will be described. In the present embodiment, the pulse-count detection sensor unit 32 and the rotational-direction detection sensor unit 33 are arranged such that $\theta_1=\theta_2+\theta_2/4$. Thus, if the rotary bezel 102 is rotated by the user, a phase difference of (⅜)t is generated between the signals of unit 32 and the signals of unit 33 where t is the period of both series of signals.

Figure 7:
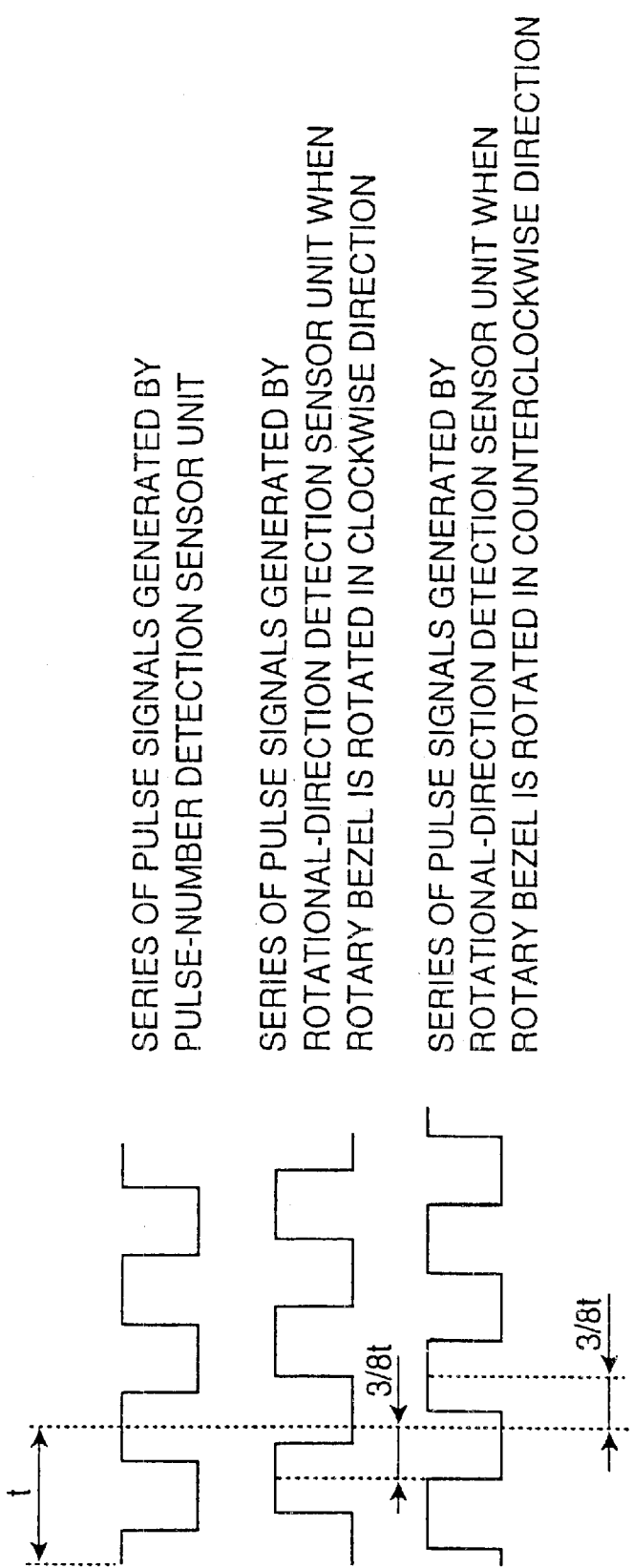
FIG. 7 is a diagram showing the series of pulse signals generated by the pulse-count detection sensor unit and series of pulse signals generated by a rotational-direction detection sensor unit in the wristwatch-type information processing device.

As shown in FIG. 7, if the rotary bezel 102 is rotated in the clockwise direction, the phase of signals of unit 33 gains that of unit 32 by (⅜)t. If the rotary bezel 102 is rotated in the counterclockwise direction, the phase of unit 33 falls behind that of unit 32 by (⅜)t. The phase gain or phase loss is detected whereby it is possible to detect the rotational direction of the rotary bezel 102.

Figure 8:
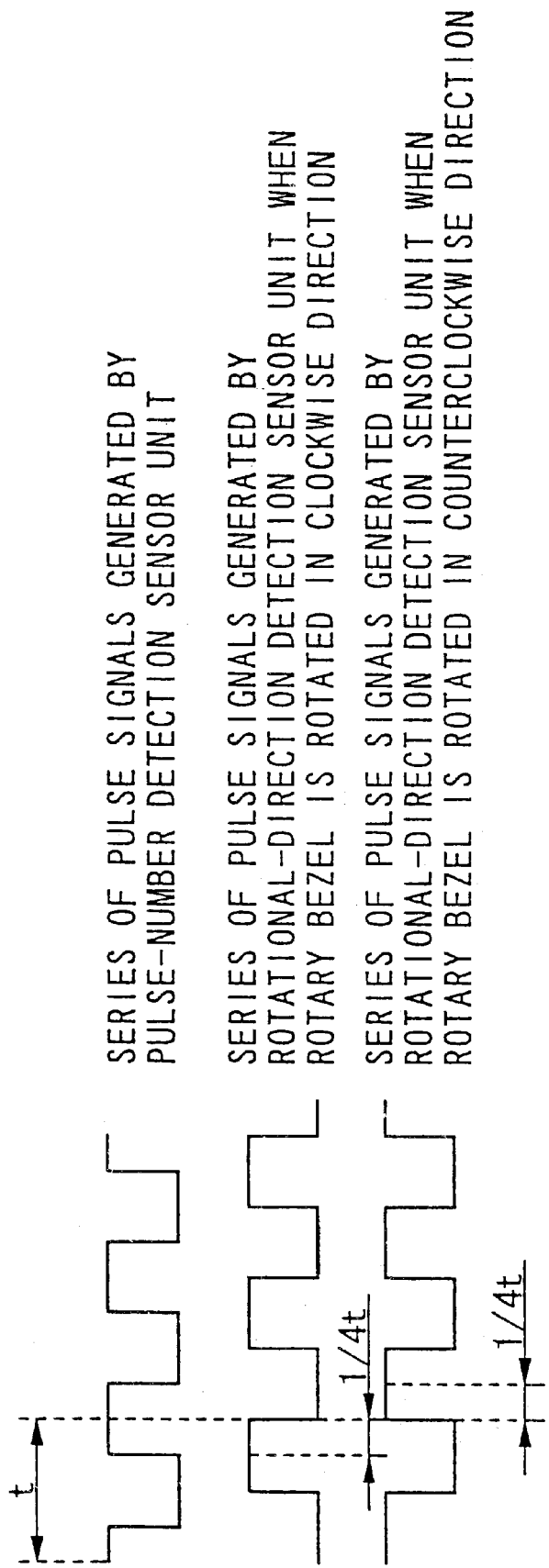
FIG. 8 is a diagram showing a series of pulse signals generated by a pulse-count detection sensor unit in a modification of the wristwatch-type information processing device, and a series of pulse signals generated by a rotational-direction detection sensor unit in the modification.

The angle $\theta_1$ is $\theta_2+\theta_2/4$ (=360/n+90/n) in the illustrated embodiment. However, it is not intended to be limited to this, and may be selected optionally as long as it is not 360k/n where k is an integer from zero to n−1. In a preferable modification, if $\theta_1=\theta_2+\theta_2/2$, a series of pulse signals shown in FIG. 8 are generated. As shown in FIG. 8, if the rotary bezel 102 is rotated in the clockwise direction, the phase of signals of unit 33 gains that of unit 32 by (¼)t. If the rotary bezel 102 is rotated in the counterclockwise direction, the phase of unit 33 falls behind that of unit 32 by (¼)t. Therefore, any $\theta_1$ may be chosen as long as a phase difference is generated in the series of pulse signals which are generated by the pulse-count detection sensor unit 32 and the rotational-direction detection sensor unit 33.

Figure 9:
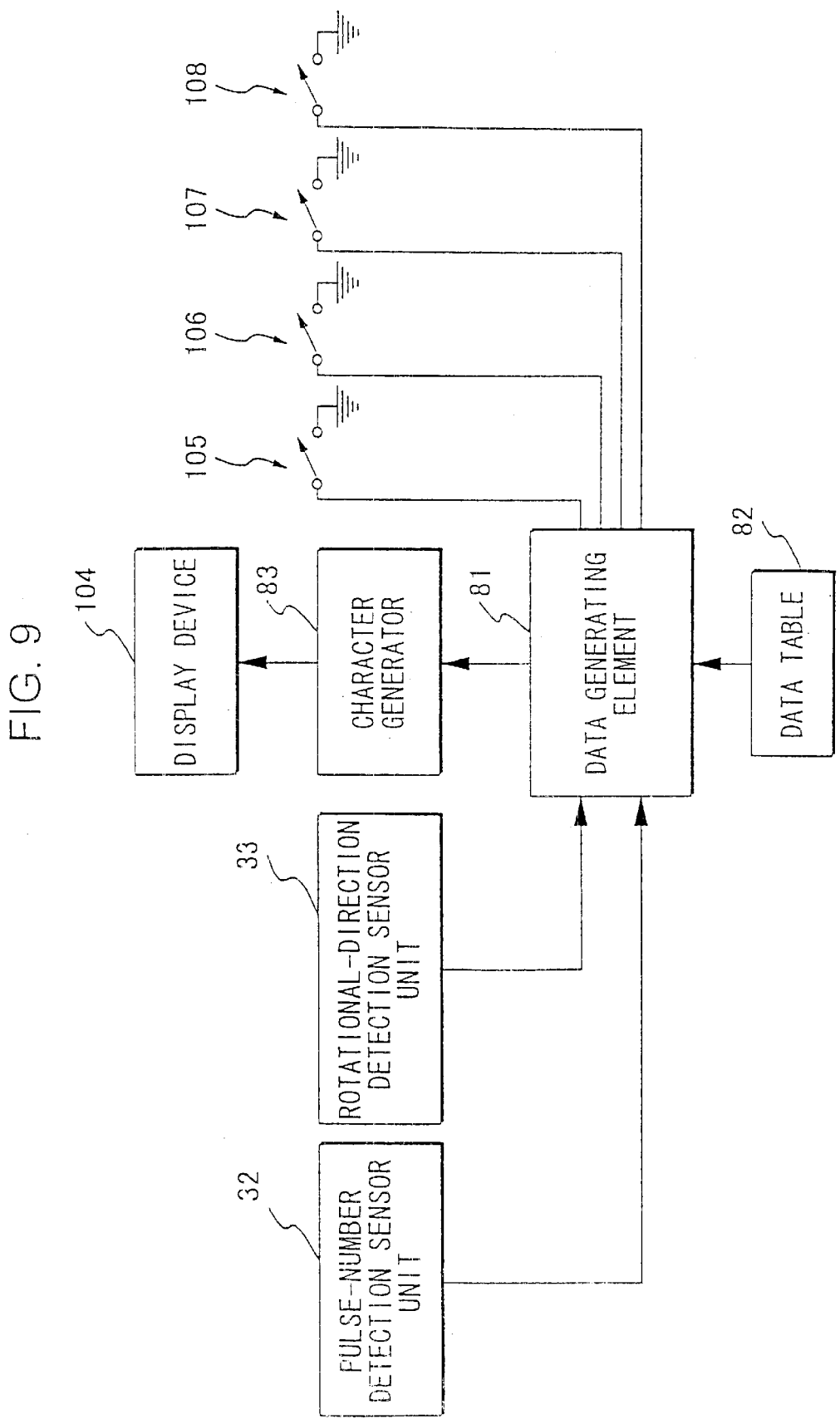
FIG. 9 is a block diagram showing a functional arrangement for generating input data in the wristwatch-type information processing device.
Figure 10:
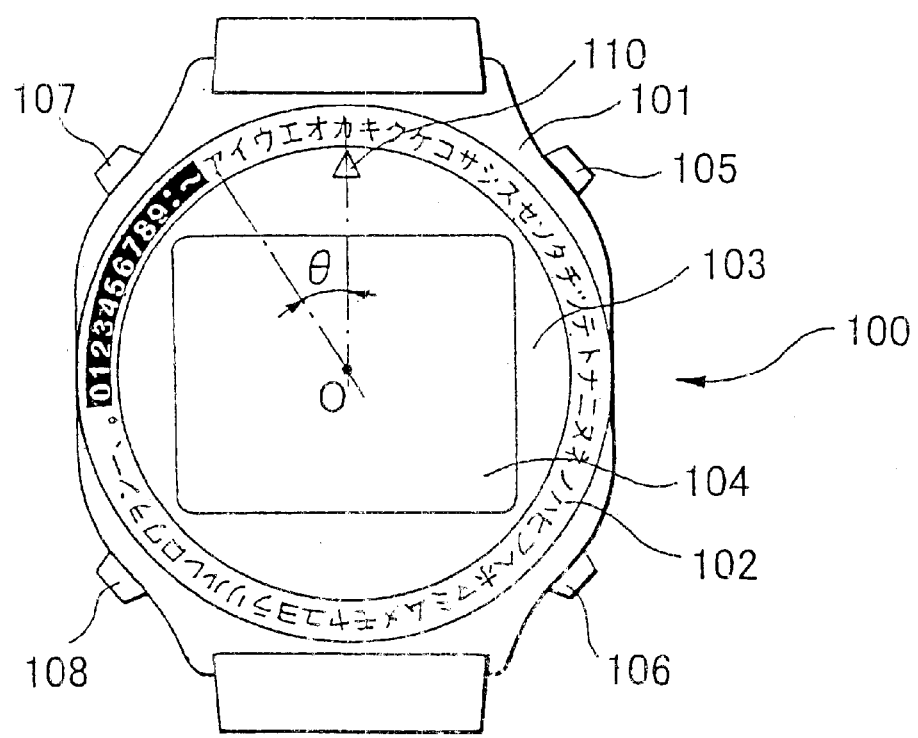
FIG. 10 is a front view showing the wristwatch-type information processing device shown in FIG. 2 in which the bezel is rotated by θ° in the counterclockwise direction.

Next, a functional arrangement which generates a data signal on the basis of the rotational angle and the rotational direction of the rotary bezel 102 which are detected in the above-described manner, and which displays a symbol corresponding to the data signal on the display device 104 will be described with reference to FIG. 9. In FIG. 9, the reference numeral 81 denotes a data-signal generating element (signal generating means). The data-signal generating element 81 has a pulse counter for counting the pulse signals generated by the pulse-count detection sensor unit 32 and the rotational-direction detection sensor unit 33, thereby detecting the rotational angle and the rotational direction of the rotary bezel 102. At this time, the data-signal generating element 81 refers to a data table 82 in which data corresponding to rotational angles and rotational directions of the rotary bezel 102 are stored, selects one of the data on the basis of the direction results, and outputs the selected datum as a data signal. A character generator 83 controls the display device 104 on the basis of the data signal, so that the display device 104 displays the symbol.

The starting point switch 108 switches the wristwatch-type information processing device 100 to a data input state. When the starting point switch 108 is turned on, the pulse counter of the data-signal generating element 81 is reset to zero so that the pulse-count detection sensor unit 32 and the rotational-direction detection sensor unit 33 are prepared to detect. The decision switch 105 may be pushed by the user to select the data signal which is generated by the data-signal generating element 81. The deletion switch 106 may be pushed by the user to delete the data signal generated by the data-signal generating element 81. If the data signal generated by the data-signal generating element 81 corresponds to kana characters of Japanese, the voiced consonant mark switch 107 may be pushed to add the voiced consonant mark in Japanese. For example, the voiced consonant mark switch 107 adds the index "゛" called the voiced consonant mark (dakuten) to the right upper side of the Japanese character for converting a Japanese character, for example, か into が. If the data signal corresponds to English characters, the voiced consonant mark switch 107 is used to switch from capital letter mode to the small letter mode and in reverse.

The data signals which are generated by the data-signal generating element 81 are not intended to be limited to correspond to symbols, and may correspond to commands for editing such as line feeding or for exchanging the mode (e.g., between a time display mode and a character input mode) of the information processing device 100. In this case, the command data such as editing characters and exchanging modes corresponding to the rotational angle and the rotational direction of the rotary bezel 102 are stored in the data table 82, the command data is generated by the data-signal generating element 81 corresponding to the detected rotational angle and rotational direction of the rotary bezel 102.

A-2. Data Input Method and Operation of the Wristwatch-type Information Processing Device Next, a data input method and the operation of the above-described wristwatchtype information processing device 100 will be described. The user sets the rotary bezel 102 to a predetermined initial position. In the present embodiment, the initial position is where the rotary bezel 102 is in the state shown in FIG. 2: the Japanese character ア is pointed by the pointer 110. Under this condition, the user depresses the starting point switch 108, whereby the wristwatch-type information processing device 100 enters the data input state, and the pulse-count detection sensor unit 32 and the rotational-direction detection sensor unit 33 are prepared to detect the rotational angle and the rotational direction of the rotary bezel 102.

If the user desires to input a symbol, for example, the Japanese character か, the rotary bezel 102 is rotated in the counterclockwise direction a position where the Japanese character か is pointed by the pointer 110. At this time, the pulse-count detection sensor unit 32 and the rotational-direction detection sensor unit 33 generate a series of pulse signals, whereby the data-signal generating element 81 detects the rotational angle θ of the rotary bezel 102 and the rotational direction of the rotary bezel 102. Then, a data signal corresponding to か is generated by the data-signal generating element 81 on the basis of the detected rotational angle and the detected rotational direction, so that the Japanese character か is displayed on the display device 104. Under this state, if the decision switch 105 is depressed, the Japanese character か is selected, and then, the device enters a standby state to wait for next data. Furthermore, if the deletion switch 106 is depressed, the Japanese character か is deleted, and then, the device enters the standby state. Further, if the voiced consonant mark switch 107 is depressed, the voiced consonant mark is added to the Japanese character か, and the Japanese character が is displayed on the display device 104.

The information processing device 100 according to the present invention can be readily made small because the arrangement is simple, although a multiplicity of data corresponding to symbols and commands can be entered. Accordingly, it is possible to shape it into the wristwatch-type as described previously.

Moreover, the pulse-count detection sensor unit 32 and the rotational-direction detection sensor unit 33 are arranged within the holes 31a and 31b which are formed in the case body 101. The holes 31a and 31b are closed by the sensor cover glass 42 and the gasket 43. Accordingly, this wristwatch-type information processing device 100 is highly water proof.

Further, since the projected ridge 48 formed on the rotary bezel 102 is fitted into the groove 34 which is formed in the case body 101, the light from outside is prevented from entering the neighborhood of the pulse-count detection sensor unit 32 and the rotational-direction detection sensor unit 33. Thus, malfunctions in the detection can be reduced.

Moreover, as described above, in the wristwatch-type information processing device 100, since the data can be input by rotating the rotary bezel 102 and depressing the decision switch 105, the data input operation is simple. Furthermore, since the symbol that is pointed to by the pointer 110 is input from among many symbols on the rotary bezel 102, misoperation such as misinput is reduced.

A-3. Modification

In a modification of the above-discussed embodiment, the symbols may not be indicated on the front surface of the rotary bezel 102. Similar to the above-described embodiment, if the data corresponding to the rotational angles and the rotational directions of the rotary bezel 102 are stored in the data table 82, this modification can be realized since the data signal may be generated on the basis of the rotational angle and the rotational direction of the rotary bezel 102 from the position where the starting point switch 108 has been depressed. With this arrangement, it is unnecessary to set the rotary bezel 102 to the above-described initial position for inputting the data. Thus, the input operation is further simplified. In this modification, since symbols are not indicated at the front surface of the rotary bezel 102, it is preferable that the data are stored in the data table 82 regularly for facilitating user's search. In a preferable example, once the starting point switch 108 is depressed regardless of the position of the rotary bezel 102, "A" is first displayed on the display device 104. When the rotary bezel 102 is rotated by $\theta_2$ degrees in the clockwise direction, "B" is displayed. When it is further rotated by $\theta_2$ degrees, "C" is displayed. In summary, the order of symbols (e.g., alphabet) with respect to the stored data is associated with the rotational angle of the rotary bezel 102. Therefore, it is easy to search for necessary data by rotating the bezel.

B. Second Embodiment

Figure 11:
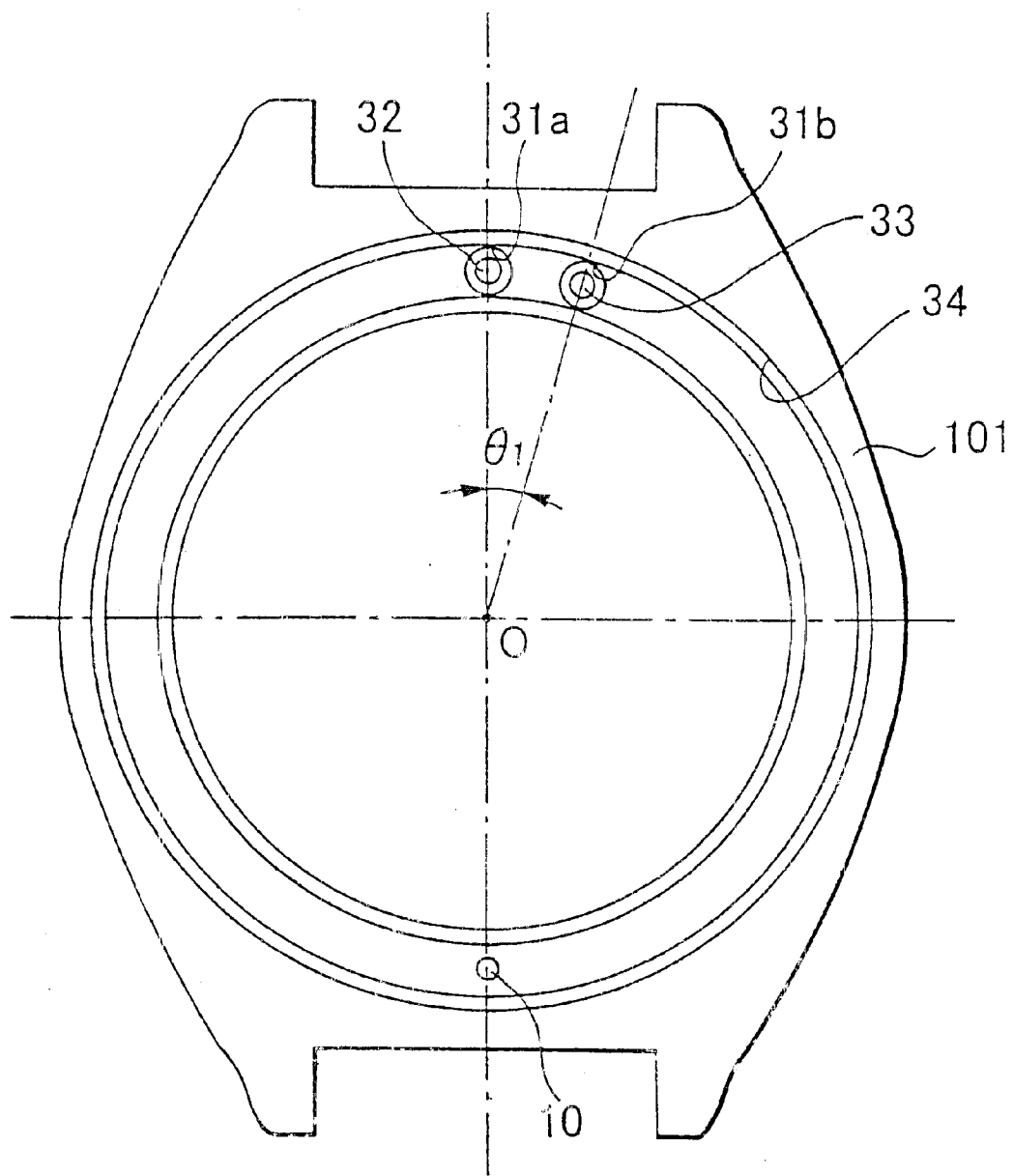
FIG. 11 is a front view showing the wristwatch-type information processing device according to a second embodiment of the present invention from which a rotary bezel is removed.
Figure 12:
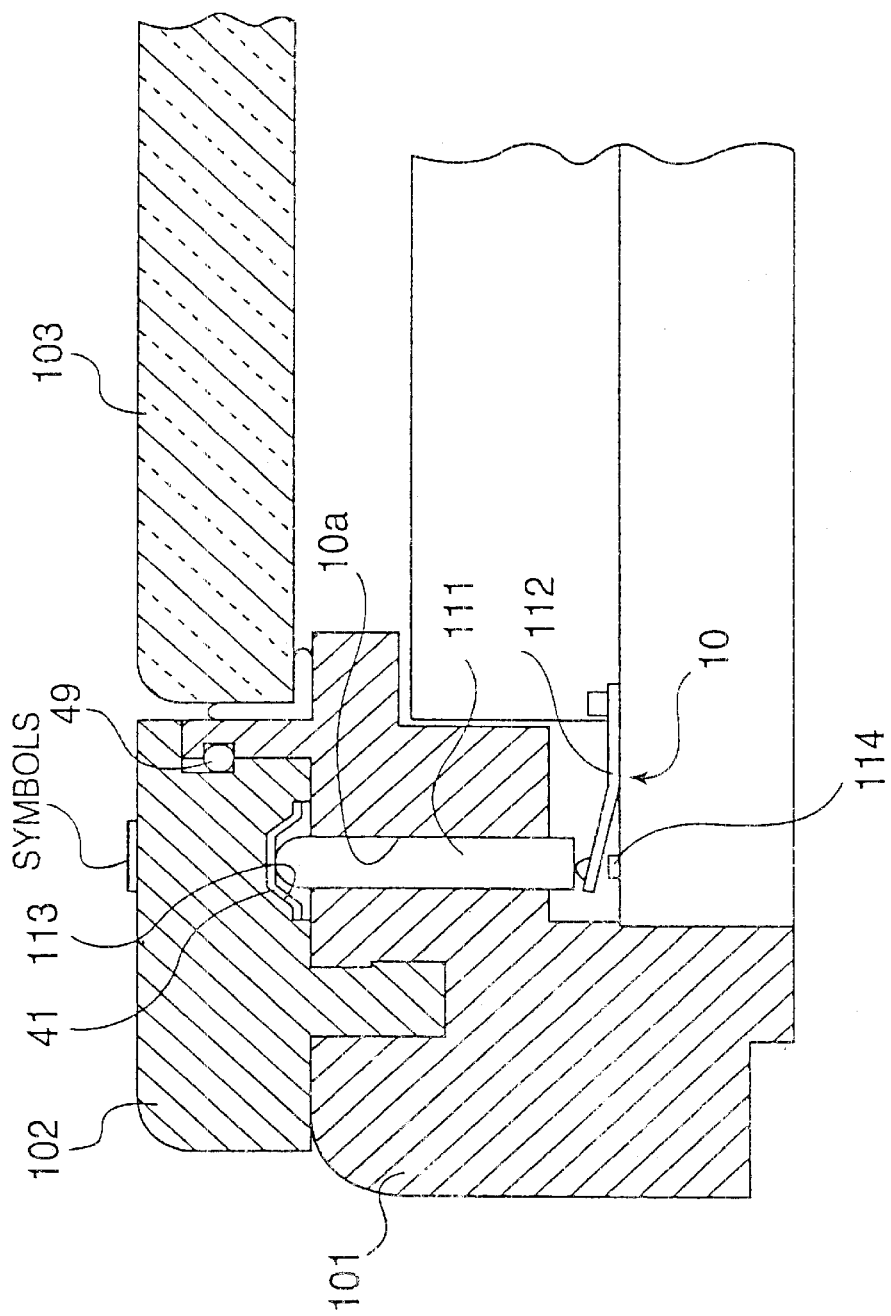
FIG. 12 is a side cross section view showing the neighborhood of a mechanical switch of the wristwatch-type information processing device according to the second embodiment.
Figure 13:
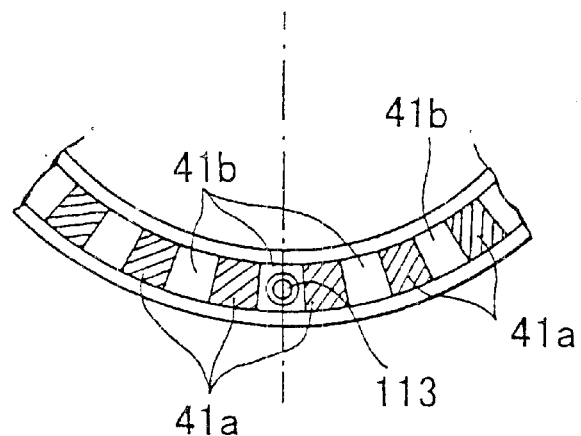
FIG. 13 is a view showing a rear surface of the rotary bezel of the wristwatch-type information processing device according to the second embodiment.

Next, a wristwatch-type information processing device according to a second embodiment of the present invention will be described with reference to FIGS. 11, 12 and 13. In FIGS. 11, 12 and 13, the same reference numerals are attached to components common to those of the first embodiment, and the description of the common components will be omitted. As shown in FIG. 11, in the present embodiment, a mechanical switch (reference-position detecting mechanism) 10 is provided in the case body 101 and is arranged at the position which confronts the optical pattern 41 (not shown in FIG. 11).

FIG. 12 is a view showing an example of the mechanical switch 10. As shown in FIG. 12, the mechanical switch 10 comprises a pin 111 which is slidably inserted into a hole 10a formed in the case body 101, and a circuit spring 112 which is in contact with the lower end of the pin 111 to push the pin 111 upwardly. As shown in FIGS. 12 and 13, a recess 113 is formed at the rear surface of the rotary bezel 102 at a position which correspond to one of the symbols on the front surface of the rotary bezel 102. In the case of the rotary bezel 102 shown in FIG. 2, the recess 113 is formed at the position corresponding to ホ. Therefore, when the pointer 110 shown in FIG. 2 points ア, the recess 113 comes to the position where the recess 113 confronts the mechanical switch 10.

With such a structure, when the pointer 110 shown in FIG. 2 points to any character other than ア, the rear surface of the rotary bezel 102 is in contact with the pin 111 to depress the circuit spring 112 downwardly. Therefore, the free end of the circuit spring 112 is in contact with a circuit switch pattern 114 formed on the wristwatch-type information processing device 100. On the other hand, when the pointer 110 points to ア, the pin 111 is moved upwardly into the recess 113 by the pushing force of the circuit spring 112. Thus, the free end of the circuit spring 112 is moved away from the circuit switch pattern 114.

In summary, the circuit spring 112 as a switch is moved away from the circuit switch pattern 114 when the initial position (a reference position) is pointed to by the pointer 110. Consequently, the pulse-count detection sensor unit 32 and the rotational-direction detection sensor unit 33 are reset, so that the detection of the rotational angle and the rotational direction from the position is started. Accordingly, it is unnecessary 2A to adjust the rotary bezel 102 to the initial position (e.g., to adjust ア to the pointer 110), so that the input operation is simplified.

The structure and the position of the mechanical switch 10 are not intended to be limited to those in the above-described embodiment, and may be optional. As an alternative, it is possible that a switch is turned on when a character at the initial position (reference position) is pointed by the pointer 110 by the rotation of the rotary bezel 102.

C. Modification

Figure 14:
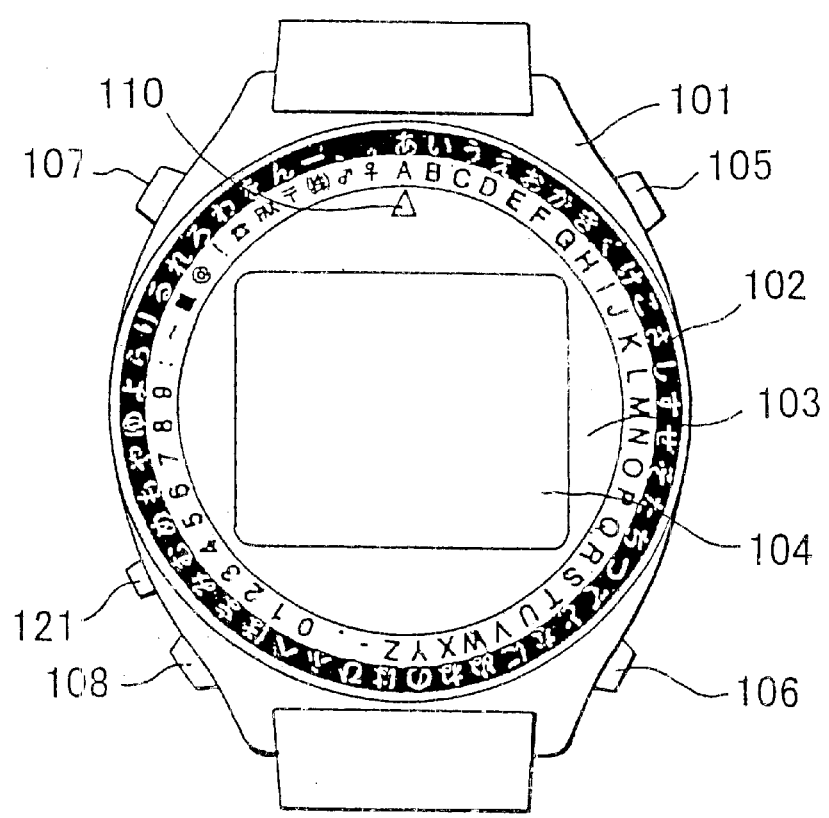
FIG. 14 is a front elevation of a modification of the wristwatch-type information processing device according to the first or second embodiment.

Next, a modification of the first or second embodiment will be described with reference to FIG. 14. In FIG. 14, the same reference numerals are attached to components which are common to those of the first or second embodiment, and the description thereof will be omitted. As shown in FIG. 14, in this modification, symbols are arranged along two circles and indicated on the front surface of the rotary bezel 102 by printing or any suitable manner. An inner-and-outer circle selection switch 121 is arranged on the periphery of the case body 101.

With this arrangement, the user can select any one of the symbols indicated at the inner circle and the outer circle by the inner-and-outer circle selection switch 121. For example, when the inner circle is selected at the state shown in FIG. 14, "A" is displayed on the display device 104. On the contrary, when the outer circle is selected, the Japanese character ア is displayed on the display device 104. Accordingly, it is possible to input twice the number of data as in the first or second embodiment.

Moreover, in all of the embodiments described above, a kanji conversion function which converts input characters to kanjis (Chinese characters) may be provided.

Furthermore, the information processing device according to the present invention is not intended to be limited to the above-described wristwatch type. Rather, it is possible to apply the present invention to any other information processing devices including a portable telephone and a portable information processing terminal. In addition, it is possible to use a disk as a rotary body instead of the rotary bezel.

What is claimed is:

1. An information processing device comprising:

a support body;

a rotary body supported on the support body for rotation around a circumference of the support body by manual operation of a user;

a detection sensor mechanism provided on the support body for detecting a rotational angle and a rotational direction of the rotary body around the circumference of the support body;

signal generating means, responsive to the rotational angle and the rotational direction detected by the detection sensor mechanism, for generating an output signal;

a display device for displaying information corresponding to the output signal generated by the signal generating means; and an optical pattern formed on a surface of the rotary body and arranged at a position that opposes the detection sensor mechanism, the detection sensor mechanism comprising a light emitting means for irradiating a detection light toward the optical pattern, and a light receiving means for detecting a reflected light from the optical pattern, and the detection sensor mechanism detecting the rotational angle and the rotational direction of the rotary body in response to light detected by the light receiving means.

2. An information processing device according to claim 1, wherein the optical pattern includes absorption areas and reflection areas, the absorption areas absorbing most of the detection light from the light emitting means, the reflection areas reflecting most of the detection light from the light emitting means, the absorption areas and reflection areas being arranged alternately in a circle coaxial with the rotary body at regular angular intervals of 360/n degrees where n is an even number, the detection sensor mechanism comprising two detection sensors arranged at two respective locations that oppose the optical pattern, the detection sensors being arranged such that a line connecting one of the detection sensors with a center of rotation of the rotary body and a line connecting the other of the detection sensors with the center of rotation of the rotary body cooperate to form an angle which is different from 360k/n degrees where k is an integer from zero to n−1.

3. An information processing device according to claim 1, further comprising a reference-position detection mechanism for detecting if the rotary body is rotated to a reference position on the support body, the detection sensor mechanism being responsive to the reference-position detection mechanism detecting that the rotary body is rotated to the reference position for thereafter detecting the rotation angle and rotation direction of the rotary body.

4. An information processing device according to claim 3, comprising a plurality of symbols indicated on the rotary body, a pointer that points to at least one of the symbols on the rotary body, the pointer formed on the support body, and the signal generating means generating a signal corresponding to the symbol pointed to by the pointer.

5. An information processing device according to claim 1, comprising a continuous projected ridge formed on the rotary body along a circle coaxial with the rotary body, a circular groove formed in the support body and the projected ridge being fitted in the circular groove, and the detection sensor mechanism being arranged inside the circular groove in the support body.

6. An information processing device according to claim 1, comprising a closed space formed in the support body, and the detection sensor mechanism being arranged in the closed space.

7. An information processing device according to claim 1, wherein the rotary body comprises a rotary bezel with a circular ring shape; the support body is formed as a wristwatch type and includes a case body and a band that winds around a wrist of the user; a closed space formed in the case body and in which the detection sensor mechanism is arranged; and a transparent member arranged between the detection sensor mechanism and the rotary body.

8. An information processing device comprising:
   a support body;
   a rotary body supported on the support body for rotation around a circumference of the support body by manual operation of a user;
   a detection sensor mechanism provided on the support body that detects a rotational angle and a rotational direction of the rotary body around the circumference of the support body;
   a signal generator, responsive to the rotational angle and the rotational direction detected by the detection sensor mechanism, for generating an output signal;
   a display device for displaying information corresponding to the output signal generated by the signal generator; and
   an optical pattern formed on a surface of the rotary body and arranged at a position that opposes the detection sensor mechanism, the detection sensor mechanism comprising a light emitter that irradiates a detection light toward the optical pattern, and a light receiver that detects a reflected light from the optical pattern, and the detection sensor mechanism detecting the rotational angle and the rotational direction of the rotary body in response to light detected by the light receiver.

9. An information processing device according to claim 8, wherein the optical pattern includes absorption areas and reflection areas, the absorption areas absorbing most of the detection light from the light emitter, the reflection areas reflecting most of the detection light from the light emitter, the absorption areas and reflection areas being arranged alternately in a circle coaxial with the rotary body at regular angular intervals of 360/n degrees where n is an even number, the detection sensor mechanism comprising two detection sensors arranged at two respective locations that oppose the optical pattern, the detection sensors being arranged such that a line connecting one of the detection sensors with a center of rotation of the rotary body and a line connecting the other of the detection sensors with the center of rotation of the rotary body cooperate to form an angle which is different from 360k/n degrees where k is an integer from zero to n−1.

10. An information processing device according to claim 8, further comprising a reference-position detection mechanism for detecting if the rotary body is rotated to a reference position on the support body, the detection sensor mechanism being responsive to the reference-position detection mechanism detecting that the rotary body is rotated to the reference position for thereafter detecting the rotation angle and rotation direction of the rotary body.

11. An information processing device according to claim 10, comprising a plurality of symbols indicated on the rotary body, a pointer that points to at least one of the symbols on the rotary body, the pointer formed on the support body, and the signal generator generating a signal corresponding to the symbol pointed to by the pointer.

12. An information processing device according to claim 8, comprising a continuous projected ridge formed on the rotary body along a circle coaxial with the rotary body, a circular groove formed in the support body and the projected ridge being fitted in the circular groove, and the detection sensor mechanism being arranged inside the circular groove in the support body.

13. An information processing device according to claim 8, comprising a closed space formed in the support body, and the detection sensor mechanism being arranged in the closed space.

14. An information processing device according to claim 8, wherein the rotary body comprises a rotary bezel with a circular ring shape; the support body is formed as a wristwatch type and includes a case body and a band that winds around a wrist of the user; a closed space formed in the case body and in which the detection sensor mechanism is arranged; and a transparent member arranged between the detection sensor mechanism and the rotary body.

* * * * *